(12) United States Patent
Ikeda et al.

(10) Patent No.: US 6,343,181 B1
(45) Date of Patent: Jan. 29, 2002

(54) METHOD AND APPARATUS FOR SUPERIMPOSING ADDITIONAL INFORMATION SIGNAL TO VIDEO SIGNAL

(75) Inventors: Nozomu Ikeda; Akira Ogino, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/131,056

(22) Filed: Aug. 6, 1998

(30) Foreign Application Priority Data

Aug. 29, 1997 (JP) .............................. 9-234696

(51) Int. Cl.[7] .............................. H04N 5/92; H04N 7/08
(52) U.S. Cl. ........................... 386/94; 380/203; 360/60; 348/473
(58) Field of Search ............................... 386/1, 45, 94, 386/125–126; 348/473, 476, 478; 380/201, 203, 210; 375/130, 140, 141; 360/60; H04N 5/76, 5/92, 9/79, 7/08

(56) References Cited

U.S. PATENT DOCUMENTS 5,982,977 A * 11/1999 Naruse et al. ................ 386/94
6,058,243 A * 5/2000 Ogino et al. .................. 386/94
6,112,008 A * 8/2000 Sugita et al. .................. 386/94
6,271,887 B1 * 8/2001 Ogino et al. ................ 348/478

FOREIGN PATENT DOCUMENTS

| EP | 0360615 | 3/1990 | ............ H04N/7/08 |
| EP | 0778566 | 6/1997 | ............ G11B/20/00 |
| EP | 0849945 | 6/1998 | ............ H04N/5/913 |

* cited by examiner

Primary Examiner—Thai Tran
(74) Attorney, Agent, or Firm—Jay H. Maioli

(57) ABSTRACT

On the occasion of superimposing a spectrum spread additional information signal obtained by spectrum spreading the additional information such as a duplication preventing control information and a copy right information, etc. to a video signal, the edge portion of an image of the video signal is detected to set the level of a part of the spectrum spread additional information signal higher than the other part in the part corresponding to the edge portion for the purpose of superimposing such additional signal to the video signal. Thereby, the additional information signal can easily be detected, without deteriorating the reproduced image.

14 Claims, 10 Drawing Sheets

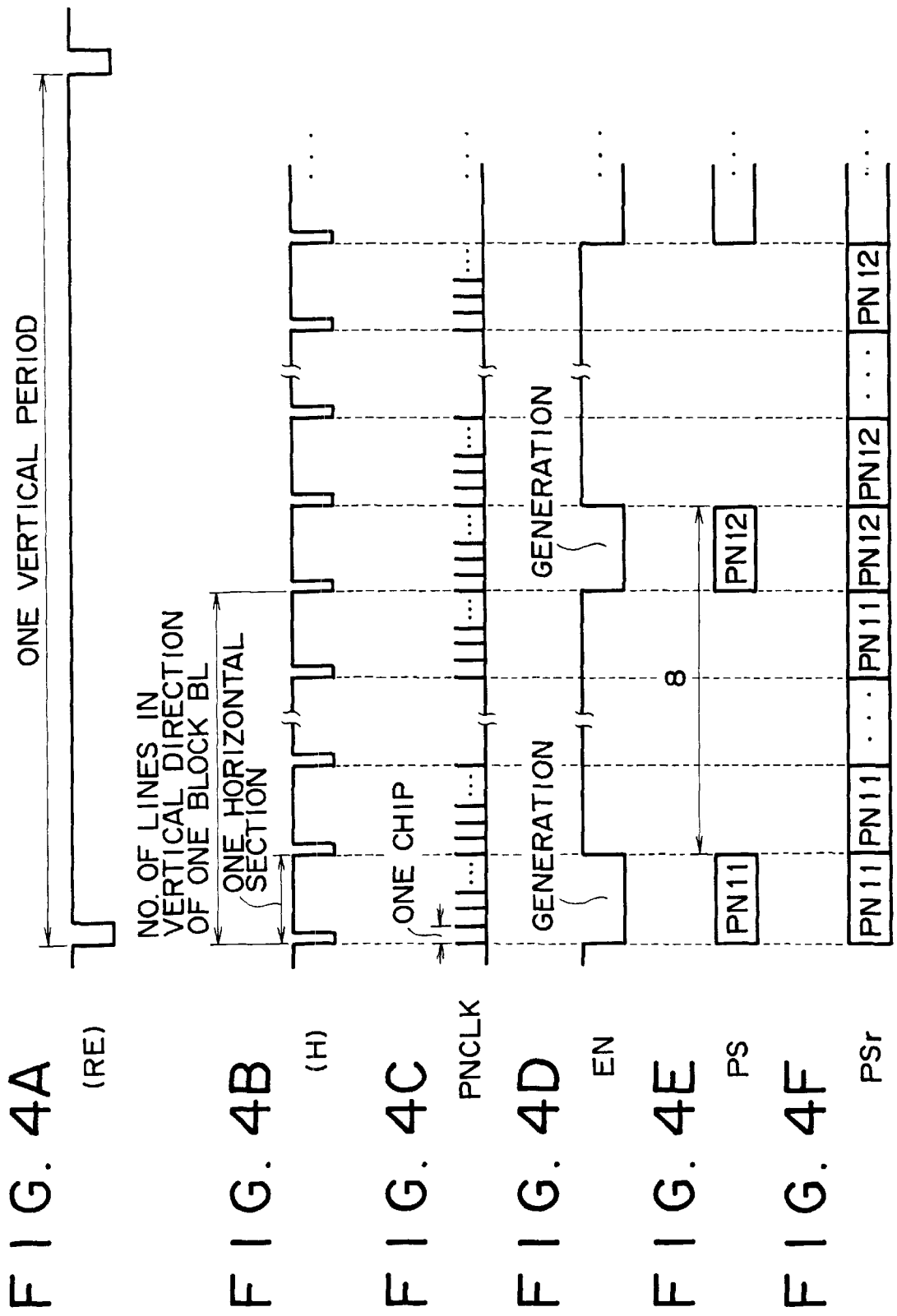

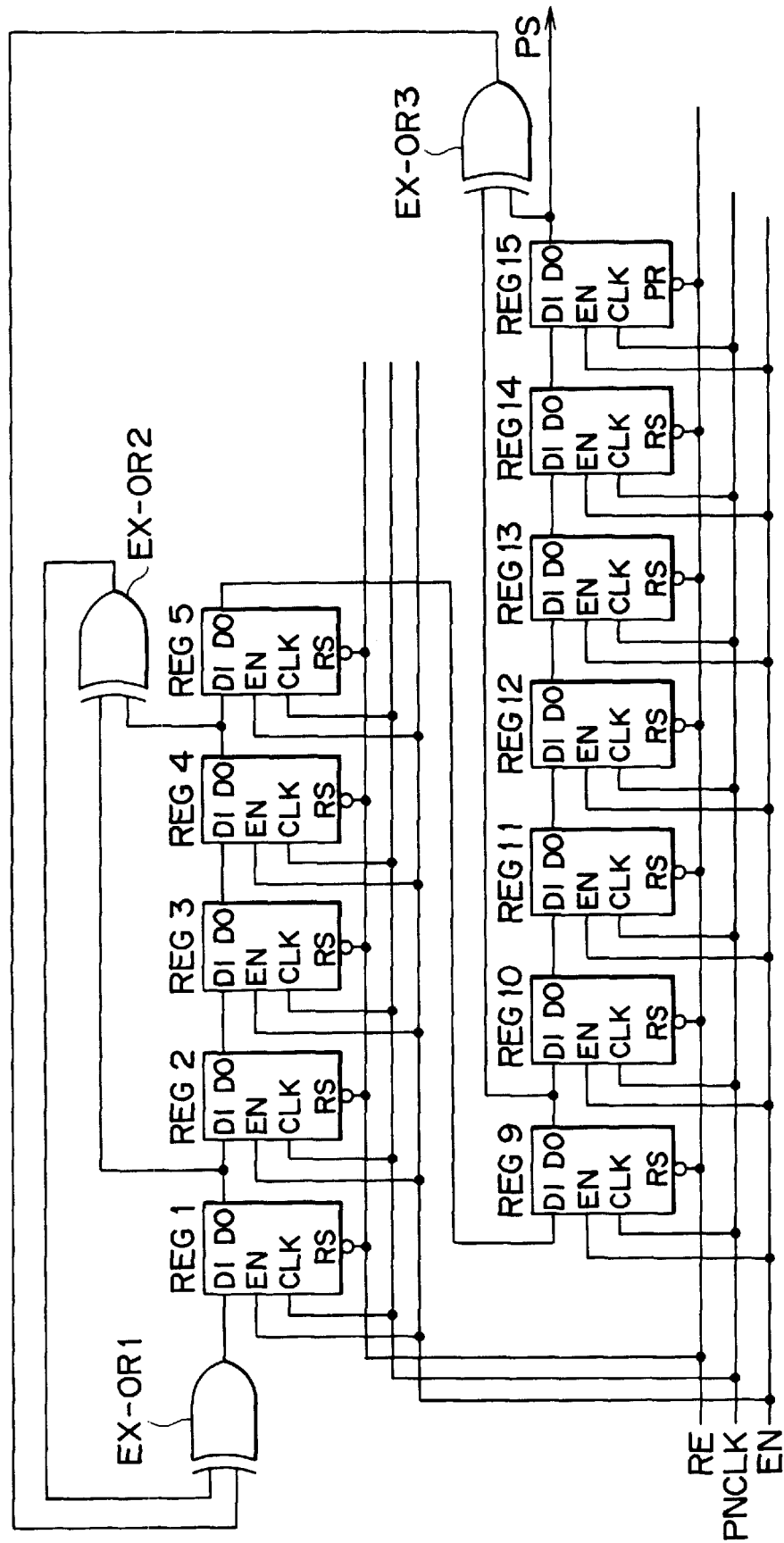
F I G. 5

FIG. 6
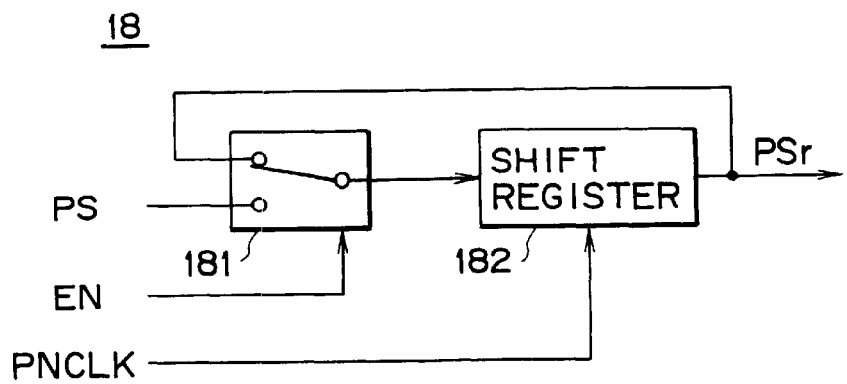
FIG. 7A
SS SIGNAL = 「O」
FIG. 7B
SS SIGNAL = 「1」
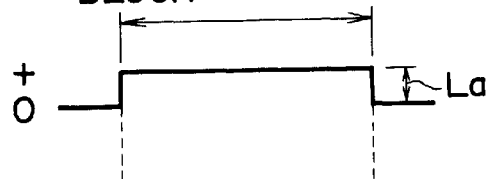
FIG. 7C
EDGE DETECTING OUTPUT
FIG. 7D
SS SIGNAL = 「O」
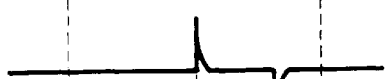
FIG. 7E
SS SIGNAL = 「1」

DUPLICATION PREVENTING CONTROL SIGNAL
SPECTRUM BEFORE SPECTRUM SPREAD

DUPLICATION PREVENTING CONTROL SIGNAL
SPECTRUM AFTER SPECTRUM SPREAD

INFORMATION SIGNAL SPECTRUM TO WHICH THE SS DUPLICATION PREVENTING CONTROL SIGNAL IS SUPERIMPOSED

SIGNAL SPECTRUM AFTER INVERSE SPECTRUM SPREAD IN THE RECORDING APPARATUS SIDE

F I G. 10A
VIDEO SIGNAL
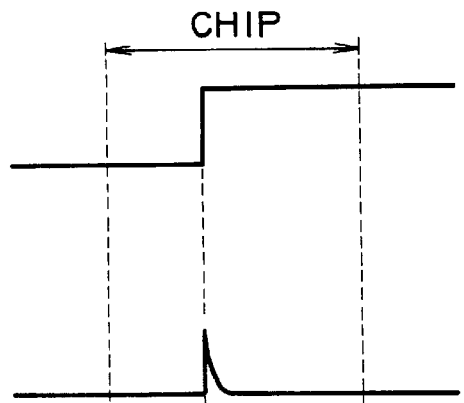
F I G. 10B
EDGE DETECTING SIGNAL
F I G. 10C
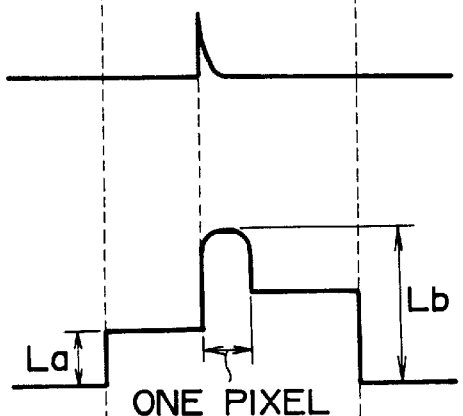
F I G. 10D
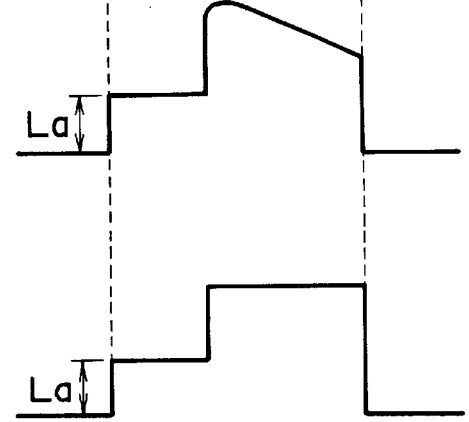
F I G. 10E

METHOD AND APPARATUS FOR SUPERIMPOSING ADDITIONAL INFORMATION SIGNAL TO VIDEO SIGNAL

BACKGROUND OF THE INVENTION

1. Field of the Invention

The present invention relates to a method and an apparatus for superimposing an additional information to a video signal in such a manner as giving influence on the reproduced video signal as least as possible.

2. Description of the Related Art

A digital information recording apparatus such as a digital VTR and a MD (Mini-disc) recording/reproducing apparatus is widely spreading and moreover a DVD (digital video disc or digital versatile disc) apparatus providing a recording function is developed at present. In such a digital information recording apparatus, a digital video signal act and digital audio signal as the main information signal and moreover various kinds of additional information signals incorporated to data for computer can be recorded.

In this case, this additional information signal is a digital signal and is added to a digital information signal as the signal to be recorded to the area which is discriminated regionally, from the digital information signal such as a header area which is added, for example, to the data in a unit of a block of the digital information signal and the other TOC (Table of Contents) area.

In the case of the existing system for recording and transmitting the main information signal by superimposing thereto an additional information, the additional information signal is not superimposed in direct to a digital information signal in the header area but is added to the indirect area. Therefore, it is likely that the additional information signal is removed rather easily because of filtering and alteration and thereby a recording apparatus and a reproducing apparatus can no longer detect the necessary additional information signal. Particularly when a control information or a copy right information to prevent unfair duplication is added as the additional information signals, the first object cannot be attained because such additional information signal is removed.

In addition, when the additional information signal is added to the indirect area as explained above, if a digital signal is converted to an analog signal, only the main information signal can be obtained, losing the additional information signal. It means that even when a measure for preventing unfair duplication of digital information signal is attempted by adding a duplication preventing control signal as the additional information signal, if the digital signal is converted to the analog signal, the measure for preventing duplication is meaningless.

As an additional information signal adding system to solve the problems as explained above that the additional information signal is removed and that a measure is no longer effective when the digital signal is converted to analog signal, the applicant of the present invention has proposed a system where the additional information signal such as duplication preventing control signal is spectrum spread, this spectrum spread additional information signal is superimposed on a video signal and this video signal is then recorded in digital or analog mode (U.S. patent application Ser. No. 08/755101).

In this system, the code of PN (Pseudorandom Noise) series (hereinafter, referred to as PN code) to be used as the spread signal is generated in sufficiently quick period, it is then multiplied to the additional information signal for the purpose of spectrum spread in view of converting the additional information signal such as narrow band and high level duplication preventing control signal into a broad band and low level signal which does not give any influence on the video signal. This spectrum spread additional information signal, namely, the spectrum spread signal is superimposed on the analog video signal for the recording on a recording medium. In this case, the video signal to be recorded on the recording medium may be analog signal or digital signal.

In this system, since the additional information signal such as the duplication preventing control signal is superimposed in the same period and same frequency as the video signal, it is difficult for a person who is trying to conduct illegal duplication, for example, to remove the superimposed duplication preventing control signal from the video signal. On the other hand, it is possible to detect and use the superimposed additional information signal such as duplication preventing control signal by the inverse spectrum spread.

As explained above, the additional information to be superimposed on the video signal must be superimposed to the video signal in a very low level not to give any influence on the reproduced image of the video signal. However, the additional information superimposed in a very low level is also required to have the level which can be detected and such level must be superimposed in the level as high as possible for the purpose of detection.

SUMMARY OF THE INVENTION

It is therefore an object of the present invention to provide a method and an apparatus for superimposing the additional signal to the video signal in the level as high as possible for easy detection without giving influence on the reproduced image of the video signal.

In the method and apparatus of the present invention for superimposing an additional information to a video signal, a spectrum spread code having the chip section corresponding to the period of one image or a plurality of pixels of the video signal is generated in synchronization with the video signal, the additional information signal is spectrum spread by the spectrum spread code to generate the spectrum spread additional information signal, thereby the edge portion of the image of the video signal is detected, when the edge portion is detected, a level changed spectrum spread additional information signal in which the level of the spectrum spread additional information signal part corresponding to the edge portion is set larger than the other portion is generated and the level changed spectrum spread additional information signal is superimposed to the video signal to generate an output video signal.

The edge portion of the video signal changes its pixel level to a large extent and when the spectrum spread additional, information signal is superimposed to this edge portion in the higher level than the other portion, it is not distinctive on the reproduced image. As explained above, since the superimposing level of the additional information signal can be raised, the additional information signal can be detected easily.

The superimposing level is determined depending on the level difference of the edge portion and therefore deterioration of the reproduced image due to the video signal can be prevented as much as possible and moreover the superimposing level as high as possible can also be set.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIGS. 4A–4F are a time chart for explaining operations of an embodiment of the additional information superimposing method of the present invention;

FIG. 5 is a diagram showing a structural example of a part of the apparatus of FIG. 1;

FIG. 6 is a diagram showing a structural example of a part of the apparatus of FIG. 1;

FIGS. 7A–7E are a diagram for explaining an example of the superimposing level control in the embodiment of the additional information superimposing method of the present invention;

FIGS. 10A–10E are a diagram for explaining another example of the superimposing level control in the preferred embodiment of the additional information superimposing method of the present invention.

DESCRIPTION OF THE PREFERRED EMBODIMENT

A preferred embodiment of the method and apparatus for superimposing an additional information to a video signal of the present invention will be explained with reference to the accompanying drawings.

In the embodiment explained below, the present invention is applied to a system in which duplication may be controlled on the occasion of supplying, for the duplication purpose, an analog output video signal to a DVD recording apparatus from a DVD reproducing apparatus as an example of the image output apparatus. Namely, in this example, an additional information to be superimposed is a duplication preventing control signal.

In this system, the spectrum spread duplication preventing control information is superimposed, as the output signal, to the analog output video signal in the DVD reproducing apparatus and this output is then supplied to the DVD recording apparatus. In the DVD recording apparatus, the spectrum spread duplication preventing control information superimposed to the analog output video signal supplied from the DVD reproducing apparatus is detected to execute the duplication control depending on the detected output. The method of superimposing the additional information of the present invention can be applied to the superimposing process of the spectrum spread signal as the additional information in the DVD reproducing apparatus.

First, the DVD reproducing apparatus in which the duplication preventing control information is superimposed through the spectrum spread will be explained.

Figure 1:
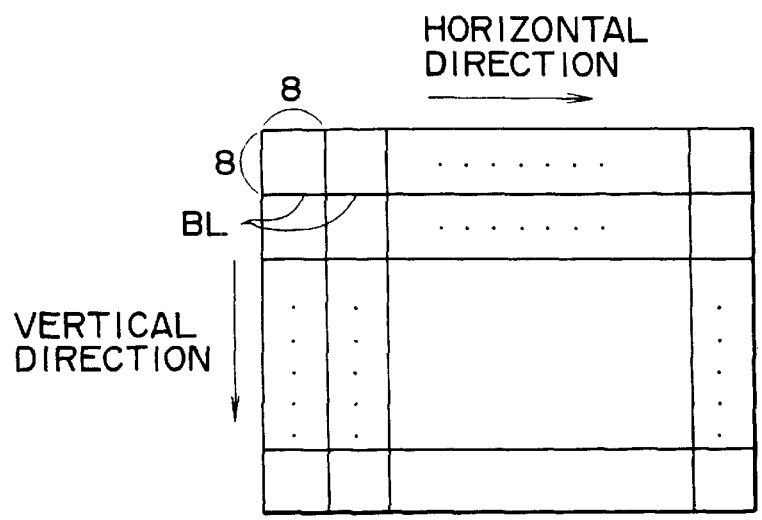
FIG. 1 is a diagram for explaining a superimposing unit to a video signal of an additional information in the preferred embodiment of the additional information superimposing method of the present invention.

In this embodiment, as shown in FIG. 1, when a video signal is divided, in its one image of one frame (or one field), into the block BL of each rectangular area consisting, for example, of horizontal direction x vertical direction=8 pixels×8 pixels, the additional information is superimposed as the spectrum spread signal to the video signal in such a manner that one chip of the spread signal is assigned to one block.

When a value of one chip of the spectrum spread signal is "0", the positive level, for example, is superimposed and when the value of one chip is "1", the spectrum spread signal as the additional information is superimposed to the video signal, for example, as the negative level. However, the level superimposed as one chip is not always constant and when the edge portion is detected in the block, since such edge portion is not distinctive, such edge portion is superimposed at least by increasing the superimposing level.

In the embodiment explained below, the spectrum spread signal is superimposed to the luminance signal Y of the video signal but not to the color signal C. It is of course possible to superimpose the spectrum spread signal to the color signal C. However, since transmission of color signal of the video signal is conducted using the elements of a couple of phase axes, for example, such as the color difference signal and the color is reproduced with the phases of these two axes, if the spectrum spread signal is superimposed to the color signal, it appears as change of hue even when the signal level is very low and such change it rather distinctive, making is difficult to superimpose the spectrum spread signal without any change of the hue. Therefore, in this embodiment, the spectrum spread signal is superimposed only to the luminance signal. However, in order to simplify the explanation, the expression of video signal is used without discrimination between the luminance signal Y and color signal C.

Figure 2:
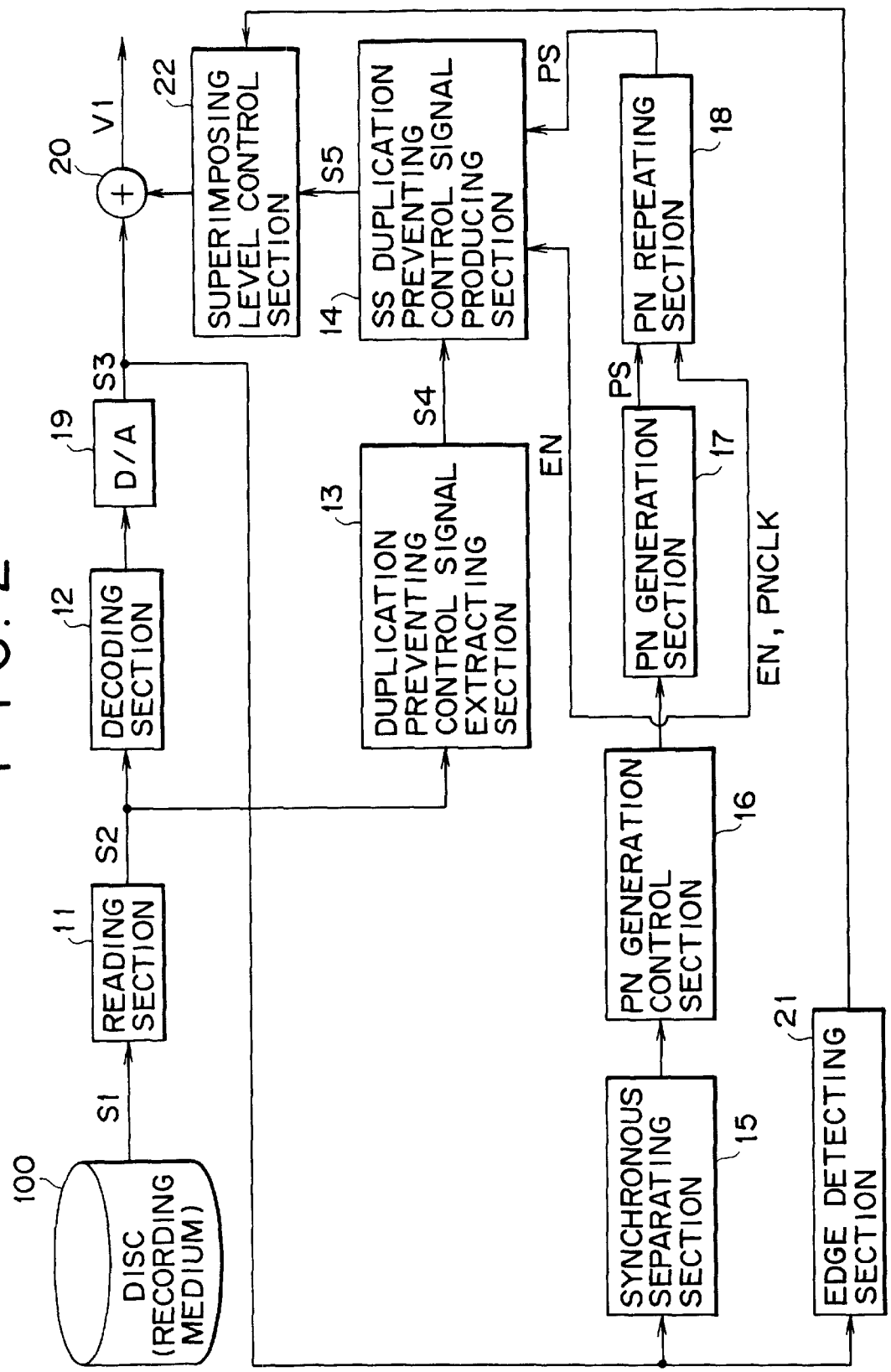
FIG. 2 is a block diagram showing an example of the apparatus to which the preferred embodiment of the additional information superimposing apparatus of the present invention is applied.

In FIG. 2, a disc 100 is a recording medium, namely a DVD, in this case in which digital video signal and audio signal are, recorded and a duplication preventing control signal is also recorded as an additional information. The duplication preventing control signal is recorded in the TOC (Table of Contents) area at the inner-most of the disc 100 or in the track area called the directory or is recorded in the track, in the different area, for recording the image data and audio data. The example explained below corresponds to the latter case and when the image data is read, the duplication preventing control signal is also read simultaneously.

The duplication preventing control signal indicates non-acknowledgment or acknowledgment of duplication of the a video signal or limitation on generation of duplication and is inserted for addition to the image data as the information of one bit or several bits. The disc 100 is loaded to the apparatus of FIG. 2 to read the recorded signal responding to the read request.

As shown in FIG. 2, the reproducing apparatus of this example is composed of a readout section 11, a decoding section 12, a duplication preventing control signal extracting section 13, an SS (SS is abbreviation of spectrum spread) duplication preventing control signal producing section 14, a synchronous separating section 15, a PN generation control section 16, a PN generating section 17, a PN repeating section 18, a D/A converting circuit 19, a superimposing section 20, an edge detecting section 21 and a superimposing level control section 22.

The readout section 11 extracts a reproduced video signal element S2 from the signal S1 obtained by reproducing the information recorded on the disc 100 and then supplies this reproduced video signal element S2 to the decoding section 12 and duplication preventing control signal extracting section 13.

The decoding section 12 executes the decoding process for the reproduced video signal element S2 to form a digital video signal and supplies this signal to the D/A converting circuit 19. The D/A converting circuit 19 executes the D/A conversion to the digital video signal to form an analog video signal S3 having the synchronous signal and then supplies this signal to the synchronous separating section 15 and adding section 20.

The duplication preventing control signal extracting section 13 extracts the duplication preventing control signal S4 added to the reproduced video signal element S2 and then supplies this signal S4 to the SS duplication preventing control signal generating section 14.

On the other hand, the synchronous separating section 15 extracts the horizontal synchronous signal H and vertical synchronous signal V from the analog video signal S3 and then supplies these signals to the PN generating control section 16.

The PN generation control section 16 produces, using the horizontal synchronous signal H and vertical synchronous signal as the reference signals, the PN generation enable signal EN indicating the section for generating the PN code, PN code reset timing signal RE (hereinafter referred to as reset signal RE) indicating the PN code generation start timing and the clock signal PNCLK.

Figure 3:
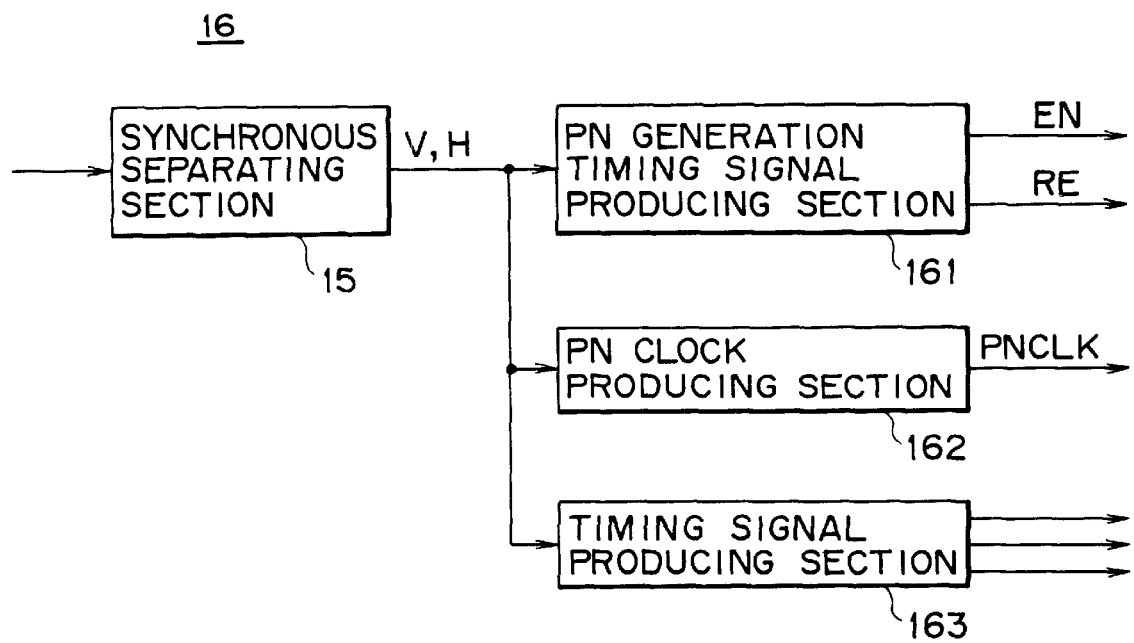
FIG. 3 is a diagram showing a structural example of a part of the apparatus of FIG. 1.

FIG. 3 is a block diagram for explaining a practical structural example of the PN generation control section 16. As shown in FIG. 3, the PN generation control section 16 is provided with a PN generation timing signal producing section 161, a PN clock producing section 162 consisting of PLL and a timing signal producing section 163. To the PN generation timing signal producing section 161 and timing signal producing section 163, the horizontal synchronous signal H and vertical synchronous signal V are supplied from the synchronous separating section 15 and to the PN clock producing section 162, the horizontal synchronous signal H is supplied from the synchronous separating section 15.

The PN generation timing signal producing section 161 uses the vertical synchronous signal V as the reference signal to produce the vertical period reset signal RE, as shown in FIG. 4A, which determines the repetition period of the PN code stream for spread to be used for spectrum spread. In this example, the reset signal RE is the vertical synchronous signal which rises at the front edge, for example, of the vertical synchronous signal V.

The PN generation timing signal producing section 161 also produces, in this example, the PN generation enable signal EN using the horizontal synchronous signal H (refer to FIG. 4B) as the reference signal. In this example, the PN generation enable signal EN is generated as the signal to generate the PN codes from the PN generating section 17 as many as the number of lines N in the vertical direction of the block BL, namely as many as one horizontal section, in this example, of every N=8 horizontal sections (refer to FIG. 4D).

As shown in FIG. 4D, this PN generation enable signal EN is low active.

The PN clock producing section 162 produces, using the PLL, the PN clock PNCLK (refer to FIG. 4C) which is synchronized with the horizontal synchronous signal H and having the period of the block BL. Namely, the PN clock PNCLK is the clock signal having the period equal to the number of pixels in the horizontal direction of one block BL, namely 8 pixels in this example. This PN clock PNCLK determines the chip period of the spread signal.

Moreover, the timing signal producing section 163 produces various kinds of timing signals to be used in the apparatus of FIG. 2 based on the vertical synchronous signal V and horizontal synchronous signal H.

The PN generation enable signal EN, PN code reset signal RE and PN clock signal PNCLK generated in the PN generation control section 16 are supplied to the PN generation section 17. The PN generation enable signal EN and PN clock signal PNCLK are also supplied to the PN repeating section 18.

The PN generating section 17 generates the PN code depending on the clock signal PNCLK, enable signal EN and PN code reset timing signal RE. Namely, the PN generating section 17 is reset by the reset signal RE, by the vertical period in this example, to generate the PN code stream PS of the predetermined code pattern from its beginning. The PN generating section 17 generates the PN code stream PS depending on the clock signal PNCLK only when the PN code generation ready condition (enable condition) is set by the enable signal EN.

In the case of this example, as explained above, the PN generating section 17 is set to the condition to generate the PN code when the enable signal EN is in the low level. Therefore, as shown in FIG. 4D, the PN code is generated in the leading one horizontal section of the 8 horizontal sections in the vertical direction of one block and the PN code is generated in such a rate of one chip for one clock of the clock PNCLK. In this case, since the PN generating section 17 is not reset in the one vertical section, the different PN code streams PN11, PN12, PN13, . . . are generated in the PN generating horizontal section as shown in FIG. 4E.

However, the PN generating section 17 is reset by the reset signal RE at the heading part of the vertical section. Therefore, different PN code streams PN11, PN12, PN13, . . . are generated in one horizontal section at the heading part of each block BL as explained above in each vertical section.

FIG. 5 shows an example of structure of the PN generating section 17. The PN generating section 17 of this example is formed of 15 D-flipflops REG1 to REG15 forming the shift registers of 15 stages and the exclusive OR circuits EX-OR1 to EX-OR3 for calculating adequate tap output of these shift registers. The PN generating section 17 shown in FIG. 5 generates, as explained above, the PN code streams PS of the M series on the basis of the enable signal EN, PN clock signal PNCLK and PN code reset timing signal RE.

The PN code stream PS from the PN generating section 17 thus obtained is supplied to the PN repeating section 18 and the enable signal EN and clock PNCLK from the PN generation control section 16 are also supplied to this PN repeating section 18.

FIG. 6 shows an example of structure of the PN repeating section 18. Namely, this PN repeating section 18 is composed of a switch circuit 181 and a shift register 182 having the number of stages as many as the number of chips of the PN code to be input to one horizontal section. The PN code stream PS is supplied to the input end a side of switch circuit

181, and an output of the shift register 182 is supplied to the other input end b side.

The enable signal EN is supplied as the switching signal of this switch circuit 181 and this switch circuit 181 is connected to the input end a side in the section where the enable signal EN is low level and the PN code stream PS is generated, while the switch circuit 181 is connected to the input end b side in the section where the enable signal EN is high level and the PN code stream PS is not generated. The clock PNCLK is supplied as the shift clock to the shift register 182.

Therefore, the PN code stream PS consisting of PN code streams PN11, PN12, PN13, . . . generated in the horizontal section at the heading part of the block BL of the PN generating section 17 is transferred to the shift register 182 through the switch circuit 181. In the remaining horizontal section in the block BL, the PN code stream PS from the PN generating section 17 once stops, but the switch circuit 181 is then connected to the input end b side s the output side of the shift register. Therefore, the shift register 182 repeatedly outputs the PN code streams PN11, PN12, PN13, . . . in one horizontal section obtained in the preceding horizontal section.

As explained above, in this example, the PN code stream generated in one horizontal section of 8 horizontal sections in each block in the PN generating section 17 is repeated in the next horizontal section of the PN repeating section 18 to produce the PN code stream PSr in which the PN code streams PN11, PN12, PN13, . . . in unit of one horizontal section continues in 8 horizontal sections in each block BL as shown in FIG. 4F. Namely, one chip of the PN code stream PS is assigned in one block. The PN code stream PSr from the PN repeating section 18 is also supplied to the SS duplication preventing control signal producing section 14.

The SS duplication preventing control signal producing section 14 spectrum spreads the duplication preventing control signal S4 extracted by the duplication preventing control signal extracting section 13 explained above with the PN code stream PSr to form the spectrum spread duplication preventing control signal (hereinafter referred to as the SS duplication preventing control signal) S5 to be superimposed on the video signal S3.

This SS duplication preventing control signal producing section 14 is provided, although not illustrated, with the duplication preventing control signal stream producing section to produce the duplication preventing control signal stream to be spectrum spread and the multiplying section for multiplying, for the purpose of spectrum spread, the generated duplication preventing control signal stream and the PN code stream PSr.

The duplication preventing control signal stream producing section 14 produces, in the case of this example, the duplication preventing control signal stream to give the same information bit content to 8 horizontal line sections in the vertical direction at least one block. For this timing control, the enable signal EN from the PN generation control section 16 is supplied to the SS duplication preventing control signal producing section 14.

The SS duplication preventing control signal S5 formed in the SS duplication preventing control signal producing section 14 is supplied to an superimposing level control section 22 and it is then converted, as is explained above, to a positive or negative level analog signal depending on the chip value and is then supplied to an superimposing section 20.

In this case, the superimposing level control section 22 outputs a positive ultra low level signal (absolute value La) when its analog level depending on the value of chip of the SS duplication preventing control signal and a value of the chip of the SS duplication preventing control signal is "0" as shown in FIG. 7A or a negative ultra low level signal (absolute value La) when a value of chip of the SS duplication preventing control signal is "1" but also outputs a large level edge portion of image as is explained above.

Therefore, an edge detecting output from the edge detecting section 21 is supplied to this superimposing level control section 22. The edge detecting section 21 detects the edge portion of the image for the analog video signal from the D/A converter 19. The edge portion can be detected by the method to detect the edge when the video signal is differentiated by the first and second differentiation and the result of differentiation has exceeded the predetermined threshold value or by the method to detect the edge when differences of adjacent pixels are detected and this difference has exceeded the predetermined threshold value.

For example, when fine segments, for example, exist in one block BL and the edge is detected by the primary differentiation by the edge detecting section 21, the edge detecting output as shown in FIG. 7C can be obtained. Therefore, in the case of this example, the superimposing level of the additional information is increased at both edges of this segment.

Namely, when the edge as shown in FIG. 7C is detected in the block BL where a value of chip of the SS duplication preventing control signal is "0", the level of the chip in the block BL is set to the positive level Lb which is larger than the positive level La at the edge portion as shown in FIG. 7D. In the same manner, when the edge is detected as shown in FIG. 7C in the block BL where the value of chip of the SS duplication preventing control signal is "1", the level of the chip in the block BL is set to the negative level Lb which is larger than the negative level La at the edge portion as shown in FIG. 7E.

As explained above, the SS duplication preventing control signal having a larger level at the edge portion in one chip is supplied to the superimposing section 20.

The superimposing section 20 superimposes the analog SS duplication preventing control signal as explained above to the analog video signal S3 to form and output an output video signal. As explained above, the superimposing section 20 has a function as a superimposing means to superimpose the SS duplication preventing control signal as the duplication preventing control signal which is spectrum spread by the PN code stream PSr to the analog video signal S3.

In this case, at least the level La explained above corresponds to the level which is lower than the dynamic range of the video signal where the SS duplication preventing control signal S5A is superimposed. The level Lb is higher than the level. La but is set to the value which does not almost generate any deterioration of video signal when the signal S5A is superimposed to the video signal.

FIG. 8 shows the spectrum indicating the relationship between the duplication preventing control signal and video signal. The duplication preventing control signal includes less amount of information and has a low bit rate and is the narrow band signal as shown in FIG. 8A. When this signal is subjected to the spectrum spread, this signal becomes a broad band signal as shown in FIG. 8(*b*). In this case, the spectrum spread signal level becomes small in inverse proportion to an expanding ratio of the frequency band.

Figure 8A:
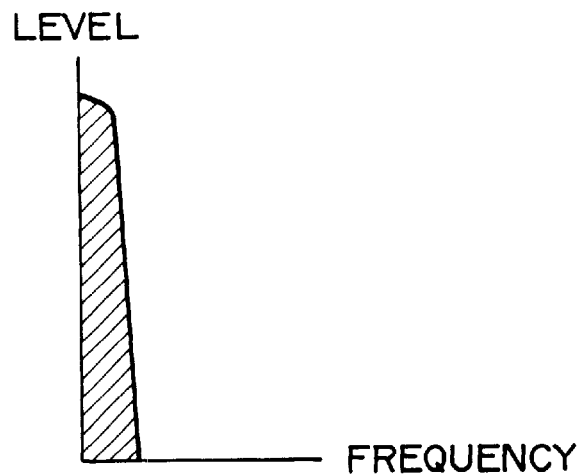
FIGS. 8A–8D are a diagram for explaining relationship between an information signal and a superimposing level of the spectrum spread signal.
Figure 8B:
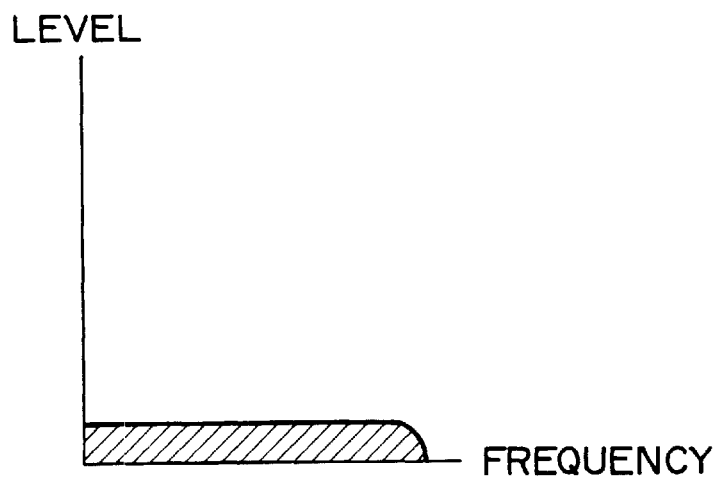
Figure 8C:
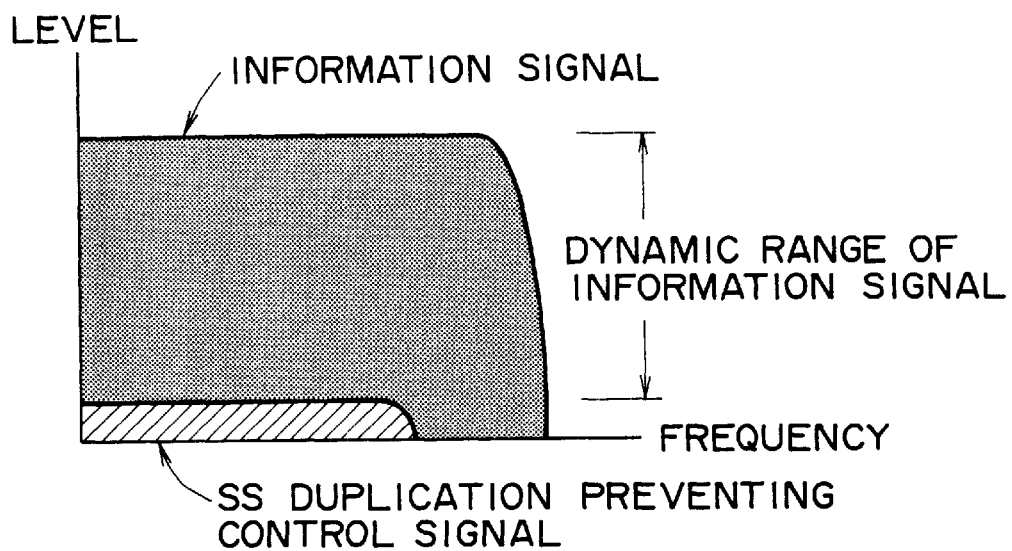

This spectrum spread signal, namely the SS duplication preventing control signal is superimposed to the information signal in the superimposing section 20. In this case, as shown in FIG. 8(c), the SS duplication preventing control signal is superimposed in the level which is lower than the dynamic range of the video signal as the information signal. With such superimposing of the SS duplication preventing control signal, the main information signal is almost not deteriorated. Therefore, as explained above, when image is reproduced by supplying, to the monitor receiver, the video signal to which the SS duplication preventing control signal is superimposed, influence of the SS duplication preventing control signal is almost not detected and good reproduced image can be obtained.

Figure 8D:
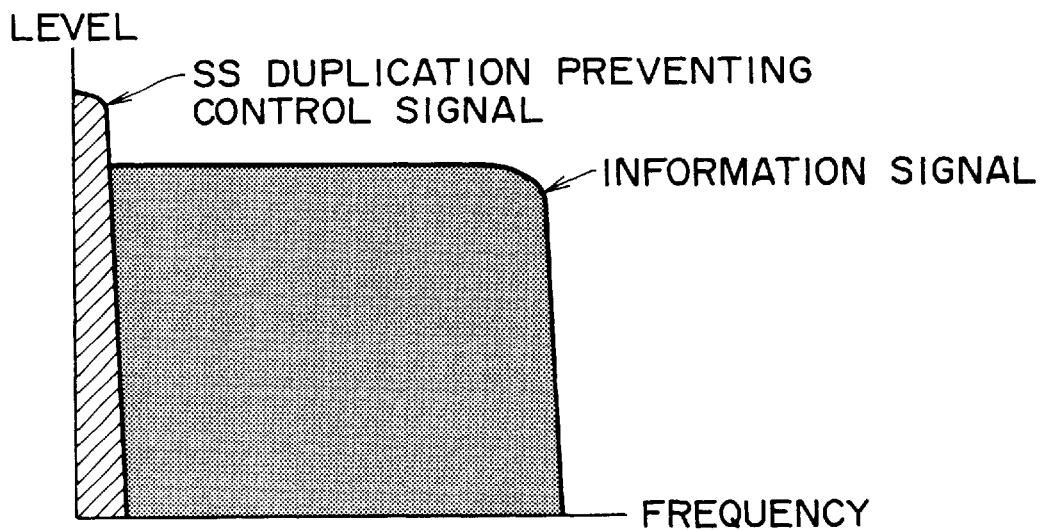

On the other hand, as will be explained later, when the A inverse spectrum spread is conducted to detect the SS duplication preventing control signal in the recording side, the SS duplication preventing control signal is recovered again as the narrow band signal as shown in FIG. 8(d). With the sufficient band spreading rate, power of the duplication preventing control signal after the inverse spread exceeds the information signal, enabling the detection thereof.

In this case, since the SS duplication preventing control signal superimposed to the analog video signal is superimposed to the analog video signal in the same time and same frequency, this SS duplication preventing control signal cannot be deleted or corrected with the frequency filter or simple replacement of the information.

Therefore, the SS duplication preventing control signal superimposed to the video signal is never removed and the SS duplication preventing control signal can surely be provided to the monitor receiver or apparatus such as a recording apparatus. Namely, since alteration and removal of the duplication preventing signal is difficult as explained above, unfair duplication can surely be prevented to realize duplication preventing control.

Moreover, in above structure, since the spectrum spread is conducted using the vertically synchronous PN code stream defining the vertical synchronous signal as the reference signal, the PN code stream for inverse spectrum spread which is required to detect this spectrum spread signal from the video signal can easily be produced on the basis of the signal synchronized with the vertical synchronous signal detected from the video signal. Namely, the synchronous control of the PN code for the inverse spread using, for example, a sliding correlator is no longer necessary. As explained, since the PN code stream for inverse spread can be produced easily, the additional information signal such as the duplication preventing control signal superimposed to the video signal through quick spectrum spread can be detected by immediately executing the inverse spectrum spread in combination with the increase of the superimposing level at the edge portion.

As explained above, the analog output video signal to which the SS duplication preventing control signal is superimposed can be supplied to the monitor receiver for displaying the image and a recording apparatus 20 explained later.

Figure 9:
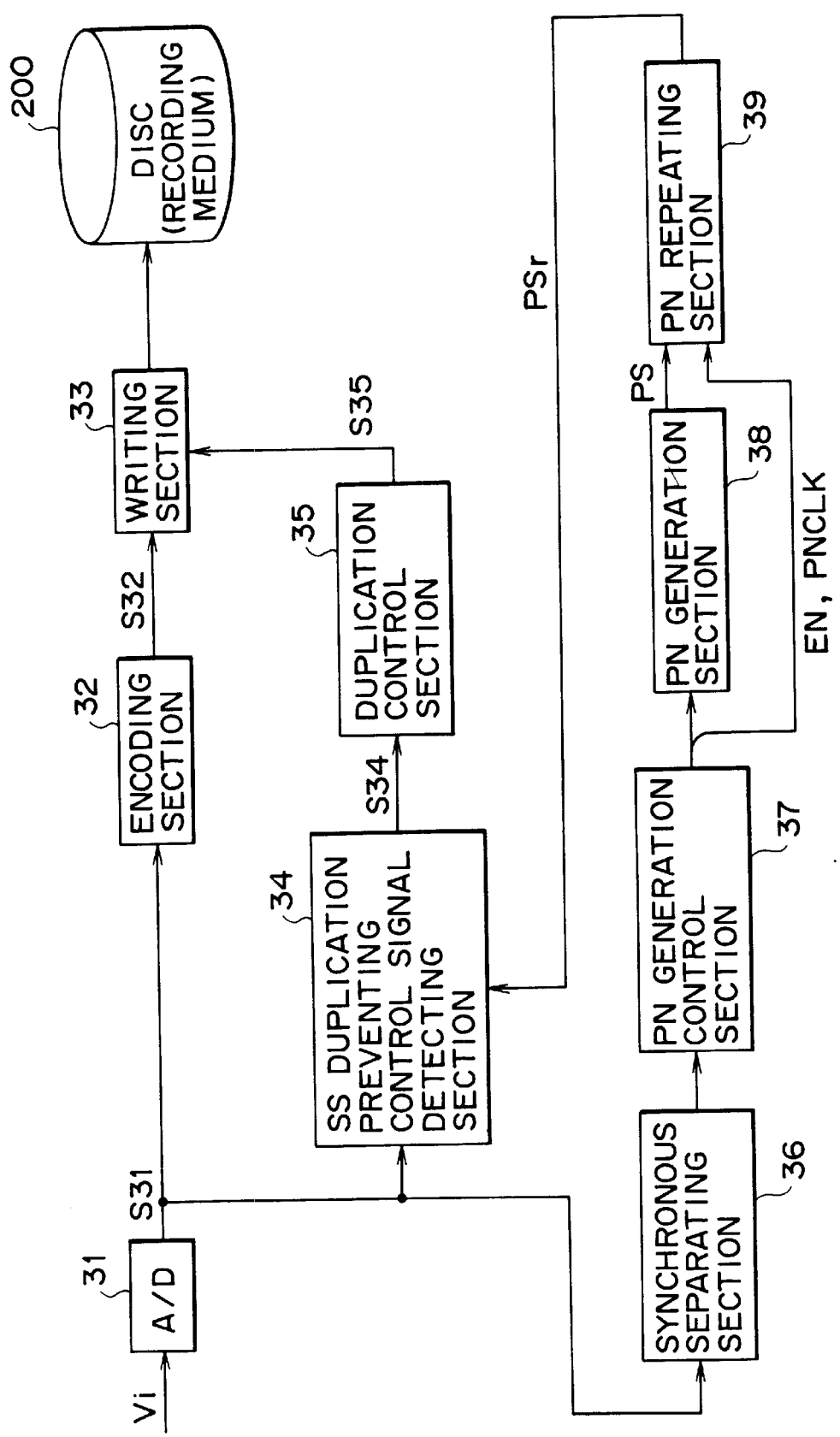
FIG. 9 is a diagram showing an example of the apparatus provided with a detecting section for additional information superimposed by the superimposing method of the present invention.

Next, a recording apparatus which receives an analog video signal from the DVD reproducing apparatus explained above and records the video signal will then be explained. FIG. 9 is a diagram for explaining a video signal recording apparatus (hereinafter referred to as a recording apparatus) used in this system.

A recording apparatus is provided, as shown in FIG. 9, with an A/D converting circuit 31, an encoding section 32, a writing section 33, a detecting section for detecting the duplication preventing control signal which is spectrum spread and superimposed to the video signal (hereinafter, referred to as SS duplication preventing control signal detecting section) 34, a duplication control section 35 for controlling acknowledgment and non-acknowledgment of duplication, a synchronous separating section 36, a PN generation control section 37, a PN generating section 38 and a PN repeating section 39. Moreover, a recording medium 200 is a DVD to which a video signal is written by this recording apparatus.

The analog video signal Vi supplied from the reproducing apparatus is converted the digital video signal S31 by the A/D converting circuit 31 and is then supplied to the encoding section 32, SS duplication preventing control signal detecting section 34 and synchronous separating section 36.

The encoding section 32 receives the digital video signal S31 to form a digital video signal S32 for recording to be supplied to the recording medium 200 through the encoding process such as elimination of the video synchronous signal and data compression of the digital video signal and then supplies this digital video signal to the writing section 33.

The synchronous separating section 36 removes the horizontal synchronous signal H and vertical synchronous signal V from the digital video signal S31 before it is encoded and then supplies these synchronous signals to the PN generation control section 37.

In this embodiment, the PN generation control section 37 of the recording apparatus is structured in the same manner as the PN generation control section 16 of the reproducing apparatus explained above using FIG. 3. Therefore, the PN generation control section 37 is explained here as having the structure shown in FIG. 3.

The PN generation timing signal producing section 161 of the PN generation control section 37 uses the vertical synchronous signal V as the reference signal to produce, corresponding to the reproducing apparatus explained above, the PN code reset timing signal RE (hereinafter, referred to as reset signal RE) for providing the reset timing of the PN code stream for inverse spread to be used for the inverse spectrum spread and also uses the horizontal synchronous signal H as the reference signal to produce the enable signal EN corresponding to the enable signal EN in the reproducing apparatus explained above. The reset signal RE produced here is the signal similar to the PN code reset timing signal RE produced in the PN generation control section 16 of the reproducing apparatus to provide the timing corresponding to the start position of the vertical section of the video signal.

The PN clock producing section 162 of the PN generation control section 37 produces the PN clock signal PNCLK synchronized with the horizontal synchronization signal H. This clock signal PNCLK corresponds to the clock signal PNCLK used in the reproducing apparatus explained above. Moreover, the timing signal producing section 163 of the PN generation control section 37 produces various kinds of timing signals on the basis of the horizontal synchronous signal H.

The reset signal RE, enable signal EN and clock signal PNCLK produced by the PN generation control section 37 are supplied to the PN generating section 38. Moreover, the enable signal EN and clock signal PNCLK from the PN generation control section 37 are then supplied to the PN repeating section 39.

The PN generating section 38 is structured like the PN generating section 17 of the reproducing apparatus shown in FIG. 5 and the PN repeating section 39 is also structured like the PN repeating section 18 of the reproducing apparatus shown in FIG. 6. Therefore, the PN code stream PSr which is same as that for the spectrum spread in the reproducing apparatus explained above can also be obtained and this code stream PSr is supplied to the SS duplication preventing control signal detecting section 34.

In this embodiment, the SS duplication preventing control signal detecting section 34 is provided with the PN code generator and multiplying circuit to have the function as the inverse spectrum spread means for extracting the duplication preventing control signal superimposed to the video signal S31 through the inverse spectrum spread.

The SS duplication preventing control signal detecting section 34 executes the inverse spectrum spread to the video signal of each vertical section to which the SS duplication preventing control signal is superimposed using PN code stream for inverse spread which is the PN code stream PSr same as the PN code stream used at the time of spectrum spread in order to remove the duplication preventing control signal superimposed to the video signal. The extracted duplication preventing control signal S34 is also supplied to the duplication control section 35.

The duplication control section 35 decodes the duplication preventing control signal S34 to discriminate whether the video signal supplied to the recording apparatus is acknowledged for duplication or not acknowledged for duplication. Depending on the result of discrimination, the write control signal S35 is produced and it is then supplied to the writing section 33. Thereby, the duplication preventing control such as acknowledgment or no-acknowledgment for writing of the video signal S32 can be executed.

The writing section 33 writes the video signal S32 to the recording medium 200 when the write control signal S35 acknowledges the writing operation but does not write the video signal S32 to the recording medium 200 when the write control signal S35 does not acknowledge the writing operation.

As explained above, the recording apparatus of this embodiment conducts the inverse spectrum spread to the video signal to which the SS duplication preventing control signal is superimposed using the PN code stream same as the PN code stream PSr used for the spectrum spread of the duplication preventing control signal in order to remove the duplication preventing control signal superimposed to the video signal.

In this case, the SS duplication preventing control signal is superimposed in a higher level to the video signal in the edge portion, the duplication preventing control signal can be detected easily in the SS duplication preventing control signal detecting section 34 and thereby adequate and quick duplication control can be conducted by quickly detecting the duplication preventing control signal.

The superimposing level control at the edge portion explained using FIG. 7 is conducted in such a special case that both ends of the edge are existing in one block, but in actual, only one end of edge is assumed to exist in many cases in one block.

For example, as shown in FIG. 10A, when only one end of the edge exists in one chip, namely in the horizontal direction in one block, an output of the primary differentiation as the edge detecting output can be obtained as shown in FIG. 10B.

For this edge detecting output, the first superimposing level as shown in FIG. 10C is used. Namely, the superimposing level is increased as many as one pixel from the position of the edge detection and in the subsequent pixel position, the superimposing level is lowered and it is maintained until the final position in the horizontal direction of one block BL. In this case, the superimposing level for the pixel position after the pixel of the edge portion can also be set to the level which is a little higher than the level La explained above as shown in FIG. 10C.

The second superimposing level is set to a higher level, for example, to Lb from the edge detecting time as shown in FIG. 10D, but thereafter this level is gradually lowered.

Moreover, the third superimposing level is set to a higher level, for example, to Lb from the edge detecting time as shown in FIG. 10E and this level is maintained up to the final position in one block BL.

The edge in the horizontal direction is shown in FIG. 10 and the superimposing level can also be controlled in the same manner for the edge in the vertical direction. In regard to FIG. 10, the control of superimposing level in the positive direction has been explained and it is also applied to the superimposing level control in the negative direction.

Next, FIG. 11 is a diagram for explaining the other method for controlling the superimposing level of the SS additional information at the edge portion. This example shows the superimposing level control of the SS additional information per chip at the edge portion in such a case that there is an edge portion, as shown in FIG. 11A, where the level changes at the intermediate position in the horizontal direction in one block BL and there is an edge portion where the level changes at the intermediate position in the vertical direction.

Figure 11A:
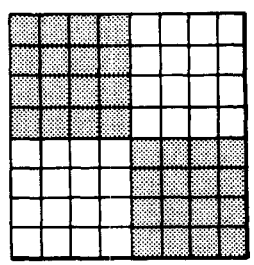
FIGS. 11A–11E are a diagram for explaining another example of the superimposing level control in the preferred embodiment of the additional information superimposing method of the present invention.
Figure 11B:
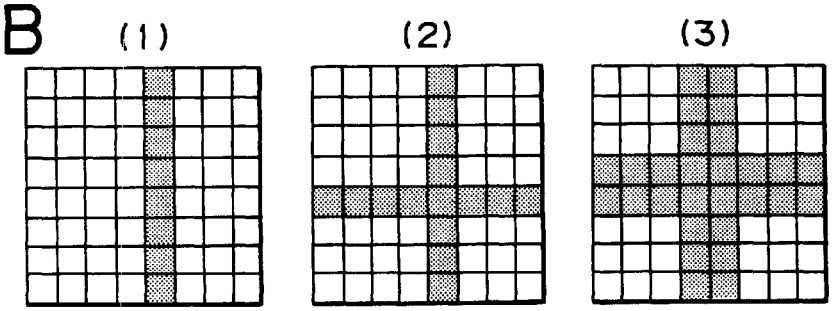

In the profile shown in FIG. 11B, when the edge is detected by the edge detecting section 21, the superimposing level control section 22 assigns, as the SS additional information superimposing level, the large level such as the level Lb explained above, for example, predetermined in the pixel position discriminated as the edge.

In the profile (1) of FIG. 11B, the SS additional information superimposing level is set, only in the horizontal direction, to the predetermined higher level Lb at the pixel position where the edge is detected. Moreover, in the profile (2) of FIG. 11B, the SS additional information superimposing level is set, in both horizontal direction and vertical direction, to the level Lb at the pixel position where the edge is detected.

Figure 11C:
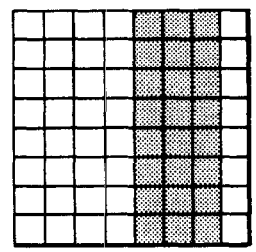

In addition, in the profile of FIG. 11C, the superimposing level control section 22 increases the SS additional information superimposing level with a fixed pattern for the position of the adjacent pixels of one or more pixels from the pixel where the edge is detected. In this case, there are two kinds of superimposing level fixing patterns. In one pattern, the superimposing level is gradually lowered and in the other pattern the superimposing level is maintained at the constant level as shown in FIG. 10D or FIG. 10E. FIG. 11C shows an example of the edge detection only in the horizontal direction, but the superimposing, level control can also be realized for the vertical direction.

Figure 11D:
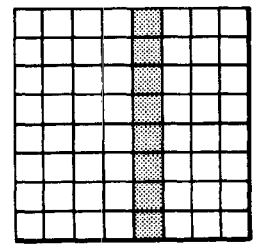

Next, in the profile of FIG. 11D, the edge detecting section 21 detects, when the edge is detected, for example, by the secondary differentiation, the detection level, namely, a difference DF of two pixels in both sides of the edge. The superimposing level control section 22 determines the superimposing level of the SS additional information to be increased depending on the amplitude of the detected difference DF. Namely, for example, the superimposing level L is determined by the following formula.

$$L = DF \times k \text{ (where k is a desired coefficient)}$$

In the profile of FIG. 11D, the additional signal is superimposed in the determined superimposing level only at the pixel position of the edge portion. In this case, the maximum value of the superimposing level to be increased is previously determined and the superimposing level is determined not to exceed such maximum value.

Figure 11E:
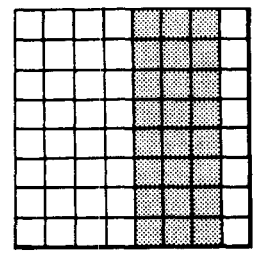

FIG. 11E shows a profile combining the profile of FIGS. 11C and FIG. 11D. In this case, the SS additional information superimposing level is increased by the fixed pattern for the position of the adjacent pixel positions of one or more pixels from the pixel where the edge is detected. But the superimposing level value is determined depending on the value of difference DF of the edge portion. In this case, the maximum value of the superimposing level to be increased is predetermined and therefore the superimposing level is determined not to exceed the maximum value.

In this example, the SS additional information is superimposed to the video signal so that one chip of the spread signal corresponds in a unit of a block. But, it is naturally possible to superimpose the additional signal in correspondence to one chip of the spread code in unit of one pixel. In this case, the superimposing level can be increased as much as possible by the superimposing level control with the method that the SS additional information superimposing level at the pixel position of edge portion is increased or the SS additional information superimposing level at the pixel position of the edge portion or the near pixel position is increased.

Moreover, it is also possible to assign one chip for the superimposing purpose to the block consisting of a plurality of pixels in one direction of the horizontal or vertical direction in place of the block consisting of a plurality of pixels in both horizontal and vertical directions.

Moreover, the spread code reset period for the spectrum spread may be a plurality of vertical periods in place of one vertical period. In addition, the reset period of the spread code may be one horizontal period or a plurality of horizontal periods.

Moreover, in above example, the superimposing level is set to positive or negative depending on the value "0", "1" of the chip of the spread code, but it is also possible to superimpose the additional signal by keeping one to zero level and the other to positive or negative level. In this case, the present invention can be applied by conducting the superimposing level control for the positive negative level.

In addition, in above explanation, the additional information signal to be superimposed after the spectrum spread is the duplication preventing control signal. As this additional information signal, not only the duplication preventing control signal but also the information regarding the digital video signal, for example, the time code information for identifying each field and copy right information can be used. As the copy right information, an apparatus number for identifying the relevant recording apparatus, for example, can be used. When this apparatus number is superimposed and recorded on the digital video signal S31, history of duplication can easily be searched.

In above explanation, moreover, the spectrum spread signal is superimposed to the analog video signal but it is naturally possible to superimpose the spectrum spread signal to the digital video signal. In this case, the present invention can be applied in natural.

Moreover, in above explanation, the additional information bits are spectrum spread by the PN code, but the present invention can naturally be applied to the detection of the spectrum spread signal by superimposing the PN codes of different series depending on the additional information bit to detect these PN codes.

In addition, the present invention can also be applied to the case where the PN code itself is superimposed to the video signal as the spectrum spread signal by determining that "1" is transmitted when the PN code is superimposed and "0" is transmitted when the PN code is not superimposed.

Moreover, the spread signal is not limited to the PN code and the gold code and the other code may be used.

Moreover, the present invention can also be applied to the case where the additional signal is not applied through the spectrum spread, the additional signal is superimposed in the ultra lower level not to give any influence on the reproduced image and moreover the additional signal is superimposed in unit of one pixel or a plurality of pixels.

In above explanation, the present invention has been applied to the recording/reproducing system, but the present invention can also be applied to the case where the additional information is superimposed to the video signal and it is then transmitted through various kinds of transmission media, for example, radio frequency signal, cable or infrared beam.

As explained above, according to the present invention, the additional information at the edge portion and at the area near the edge portion is superimposed to the video signal in the level higher than the other portion. Thereby, the additional information can be detected easily while minimizing the influence on the reproduced image of the additional information.

What is claimed is:

1. A method of superimposing an additional information signal on a video signal, comprising the steps of:
    producing, in synchronization with said video signal, a spectrum spread code having a chip section corresponding to one of a period of one pixel and a Period of a plurality of pixels of an image of said video signal;
    producing a spectrum spread additional information signal by spectrum spreading said additional information signal with said spectrum spread code;
    detecting an edge portion of said image of said video signal;
    producing, when said edge portion is detected, a level changed spectrum spread additional information signal wherein a first level of a first part of said spectrum spread additional information signal corresponding to said edge portion is set higher than a second level of a second part of said spectrum spread additional information signal; and
    producing an output video signal by superimposing said level changed spectrum spread additional information signal on said video signal.

2. The method of superimposing an additional information signal on a video signal according to claim 1, wherein, when said chip section of said spectrum spread code corresponds to said plurality of pixels of said image of said video signal, said first level of said first part of said spectrum spread additional information signal is set higher than said second level of said second part of said spectrum spread additional information signal in such a degree for not generating deterioration of said image of said video signal in said chip section corresponding to said plurality of pixels including said edge portion of said spectrum spread additional information signal.

3. The method of superimposing an additional information signal on a video signal according to claim 2, wherein said first level of said first part of said spectrum spread additional information signal is set to a constant level in said spectrum spread additional information signal.

4. The method of superimposing an additional information signal on a video signal according to claim 2, wherein said first level of said first part of said spectrum spread additional information signal is gradually reduced in said spectrum spread additional information signal.

5. The method of superimposing an additional information signal on a video signal according to claim 2, wherein said first level of said first part of said spectrum spread additional information signal is increased one step for each said one pixel of said edge portion in said spectrum spread additional information signal.

6. The method of superimposing an additional information signal on a video signal according to claim 1, wherein said edge portion of said image of said video signal is detected by comparing a differential level obtained by differentiation of said video signal with a predetermined level.

7. The method of superimposing an additional information signal on a video signal according to claim 1, wherein said first level of said first part of said spectrum spread additional information signal is determined depending on a differentiation level obtained by a differentiation of said video signal.

8. An apparatus for superimposing an additional information signal on a video signal, comprising:

spectrum spread code producing means for producing, in synchronization with said video signal, a spectrum spread code having a chip section corresponding to one of a period of one pixel and a period of a plurality of pixels of an image of said video signal;

spectrum spread means for producing said spectrum spread additional information signal by spectrum spreading said additional information signal with said spectrum spread code produced by said spectrum spread code producing means;

edge detecting means for detecting an edge portion of said image of said video signal;

level control means for producing, in response to a detected output from said edge detecting means, a level control spectrum spread additional information signal wherein a first level of a first part of said spectrum spread additional information signal is higher than a second level of a second part of said spectrum spread additional information signal; and signal superimposing means for producing an output video signal by superimposing said level controlled spectrum spread additional information signal from said level control means on said video signal.

9. The apparatus for superimposing an additional information signal on a video signal according to claim 8, wherein, when said chip section of said spectrum spread code corresponds to said plurality of pixels of said image of said video signal, said level control means sets, in said chip section corresponding to said plurality of pixels including said edge portion of said spectrum spread additional information signal,said first level of said first part of said spectrum spread additional information signal to a level higher than said second level of said second part of said spectrum spread additional information signal in such a degree for not deteriorating said image of said video signal.

10. The apparatus for superimposing an additional information signal on a video signal according to claim 9, wherein said level control means maintains said first level of said first part of said spectrum spread additional information signal at a constant level in said spectrum spread additional information signal.

11. The apparatus for superimposing an additional information signal on a video signal according to claim 9, wherein said level control means gradually reduces said first level of said first part of said spectrum spread additional information signal in said spectrum spread additional information signal.

12. The apparatus for superimposing an additional information signal on a video signal according to claim 9, wherein said level control means increases one step, for each of said one pixel of said edge portion, said first level of said first part of said spectrum spread additional information signal in said spectrum spread additional information signal.

13. The apparatus for superimposing an additional information signal on a video signal according to claim 8, wherein said edge detecting means compares a differentiation level obtained by differentiation of said video signal with a predetermined level for detecting said edge portion of said image of said video signal.

14. The apparatus for superimposing an additional information signal on a video signal according to claim 8, wherein said level control means determines said first level of said first part of said spectrum spread additional information signal depending on a differentiation level obtained by differentiating said video signal.

* * * * *